US012079892B2

(12) United States Patent
Attarzadeh (10) Patent No.: US 12,079,892 B2
(45) Date of Patent: Sep. 3, 2024

(54) METHODS AND SYSTEMS FOR FACILITATING LOCATING AN INDIVIDUAL BASED ON UHF RFID TAGS

(71) Applicant: FreeLiveNet Technology Corp., North Vancouver (CA)

(72) Inventor: Hamid Attarzadeh, North Vancouver (CA)

(73) Assignee: FreeLiveNet Technology Corp., North Vancouver (CA)

( * ) Notice: Subject to any disclaimer, the term of this patent is extended or adjusted under 35 U.S.C. 154(b) by 0 days.

(21) Appl. No.: 18/091,045

(22) Filed: Dec. 29, 2022

(65) Prior Publication Data

US 2023/0237606 A1 Jul. 27, 2023

Related U.S. Application Data

(60) Provisional application No. 63/303,879, filed on Jan. 27, 2022.

(51) Int. Cl.
*G06Q 50/26* (2024.01)
*G06K 7/10* (2006.01)
*G08B 21/02* (2006.01)

(52) U.S. Cl.
CPC ....... *G06Q 50/265* (2013.01); *G06K 7/10346* (2013.01); *G08B 21/0247* (2013.01)

(58) Field of Classification Search
None
See application file for complete search history.

(56) References Cited

U.S. PATENT DOCUMENTS

| 7,584,048 B2 | 9/2009 | Pham et al. |
| 2008/0042836 A1 | 2/2008 | Christopher |
| 2019/0156643 A1* | 5/2019 | Quilter ............... G08B 21/0227 |

FOREIGN PATENT DOCUMENTS

CN 102306264 A 1/2012

OTHER PUBLICATIONS

Chen, Design of a Child Localization System on RFID and Wireless Sensor Networks, 2010, Journal of Sensors.
Kravets, Tracking School Children with RFID Tags? It's All about the Benjamins, Sep. 2012, WIRED Magazine.

* cited by examiner

*Primary Examiner* — Suezu Ellis (57) ABSTRACT

A method and a system for receiving a search request from at least one user device associated with at least one user; generating a search command based on the search request; transmitting the search command to the server to and return data associated with at least one RFID reader device; receiving the response data from the at least one RFID reader device; processing at least one of the response data and the search request; determining a location data associated with at least one individual based on the processing; generating an alarm based on the location data; transmitting at least one of the location data and the alarm to the at least one user device; and storing the search request, the search command, the response data, and the location data.

20 Claims, 8 Drawing Sheets

METHODS AND SYSTEMS FOR FACILITATING LOCATING AN INDIVIDUAL BASED ON UHF RFID TAGS

FIELD OF THE INVENTION

The present invention relates generally to data processing. More specifically, the present invention is methods and systems for facilitating locating an individual based on UHF RFID (Ultra High-Frequency Radio Frequency Identification) tags.

BACKGROUND OF THE INVENTION

The field of data processing is technologically important to several industries, business organizations, and/or individuals. In particular, the use of data processing is prevalent for facilitating locating an individual.

For all parents or caregivers, one of the concerns is always what if they don't find their kid. One obvious answer is to give them a GPS device, such as a GPS watch. But what about indoor places, or big shopping malls with multilevel stores. In big shopping malls when a kid is reported lost, the parents or caregivers start looking at the security cameras and try to find the kid and if they don't find the kid after a certain number of minutes, the parent may lock the doors to make sure the kid does not go out, which might be too late.

Existing techniques for facilitating locating an individual are deficient with regard to several aspects. For instance, current technologies do not locate the kid in indoor places. Currently for indoors like amusement parks, big shopping malls, the only way to locate a lost kid or pet is to go through the security cameras which is not accurate and most of the time it is too late as if a kid has left the building it cannot be located and by the time reviewing the recordings, the kid or pet might have gone too far.

Therefore, there is a need for improved methods and systems for facilitating locating an individual based on UHF RFID tags that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

According to some embodiments, a system for facilitating locating an individual based on UHF RFID tags is disclosed. Further, the system may include a communication device configured for receiving a search request from at least one user device associated with at least one user. Further, the communication device may be configured for transmitting a search command to at least one RFID reader device. Further, the communication device may be configured for receiving the response data from the at least one RFID reader device. Further, the communication device may be configured for transmitting at least one of location data and an alarm to the at least one user device. Further, the system may include a processing device configured for generating the search command based on the search request. Further, the processing device may be configured for processing at least one of the response data and the search request. Further, the processing device may be configured for determining the location data associated with the at least one individual based on the processing. Further, the processing device may be configured for generating the alarm based on the location data. Further, the system may include a storage device configured for storing the search request, the search command, the response data, and the location data.

In further embodiments, a method for facilitating locating an individual based on UHF RFID tags is disclosed. Further, the method may include receiving, using a communication device, a search request from at least one user device associated with at least one user. Further, the method may include generating, using a processing device, a search command based on the search request. Further, the method may include transmitting, using the communication device, the search command to at least one RFID reader device. Further, the method may include receiving, using the communication device, the response data from the at least one RFID reader device. Further, the method may include processing, using the processing device, at least one of the response data and the search request. Further, the method may include determining, using the processing device, location data associated with the at least one individual based on the processing. Further, the method may include generating, using the processing device, an alarm based on the location data. Further, the method may include transmitting, using the communication device, at least one of the location data and the alarm to the at least one user device. Further, the method may include storing, using a storage device, the search request, the search command, the response data, and the location data.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAIL DESCRIPTIONS OF THE INVENTION

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of methods and systems for facilitating locating an individual based on UHF RFID tags, embodiments of the present disclosure are not limited to use only in this context.

Overview

The present disclosure describes methods and systems for facilitating locating an individual based on UHF RFID tags. Further, for all parents or caregivers, one of the concerns is always what if they don't find their kid. One obvious answer is to give them a GPS device, such as a GPS watch. But what about indoor places, or big shopping malls with multilevel stores. In big shopping malls when a kid is reported lost, the parents or caregivers start looking at the security cameras and try to find the kid and if they don't find the kid after a certain number of minutes, the parent or security team may lock the doors to make sure the kid does not go out, which might be too late.

Further, the disclosed system may be configured for using a UHF RFID (Ultra High-Frequency Radio Frequency Identification) tag attached to the kid that may be used to easily locate the kid in indoor places. Currently for indoors like amusement parks, big shopping malls, the only way to locate a lost kid or pet is to go through the security cameras which is not accurate and most of the time it is too late as after a kid has left the building, the kid cannot be located, and by the time reviewing the recordings, kid or pet might have gone too far.

Further, the disclosed system may be associated with a passive UHF RFID tag attached to the Kid, by either having it as a sticker or a wristband or necklace, or any other form that is being attached to the kid. For example embedded in the uniform. Further, the disclosed system may include RFID readers in the entrances, exits, or places where usually people gathered. Further, it may be easy to locate a kid in a matter of minutes by checking the last known location.

Further, the disclosed system may be configured for locating, kids, pets in indoor locations such as a shopping mall, large places like aquariums, playgrounds, etc. Further, the disclosed system may be configured for tracking people and their interests in a shopping center or a museum. Further, disclosed system may be configured for activating an alarm by notifying a lost kid as soon as it is detected close to any of the readers. Further, disclosed system may be configured to count people inside and update the total number in real-time as people leave the place.

Further, the UHF RFID tags may be read by a proper antenna from a distance even more than 2 meters. The UHF RFID reader (or the reader) may be configured to read multiple tags at the same time and also distinguish the distance between the tag (RFID tag) and the antenna. By installing the antenna at a proper angle, the disclosed system may identify the direction of movement where the person is moving (entering or existing). As soon as the tag is read by the reader (or the UHF RFID reader), a tag UID (Unique Identification Number) along with a reader ID may be sent to a server. The server reads the tag and sends a location update to a person who has registered the tag. Further, if a tag is marked as lost, the reader may start the alarm as soon as the lost tag is read by the reader.

Further, normal conventional RFID tags have a very short reading distance and require tags to be very close to the reader. But using the UHF RFID tags makes it doable to read tags from distance.

Since the antenna face may be pointing at one side of a gate (wherein the gate can be installed on a door or a wall of a room and the antenna can be configured to detect someone's movement entering the room), the reader detects a tag signal power and we can detect the direction of movement when someone enters or leaves a gate. As the tag gets close to the antenna from the front, the antenna starts reading and the signal power. It starts from low and goes to high. Further, when the tag enters behind the antenna, the signal may not be detected until the tag passes the gate. In this case, it starts with a high signal and goes low, as the tag passes by. This can help detecting if the tag holder has entered or left the building or a place.

Further, the disclosed system may include an indoor positioning system that includes three main components, namely, the readers, simultaneous multi-tag RFID reader with an antenna, and the UHF RFID tag. Further, the UHF RFID tags may be distributed in a form or sticker, embedded into a uniform or wristband or necklace, or even attached to a bag or cart. Further, the disclosed system may be associated with an application server that receives data from the reader and distributes it to mobile or other devices.

Figure 1:
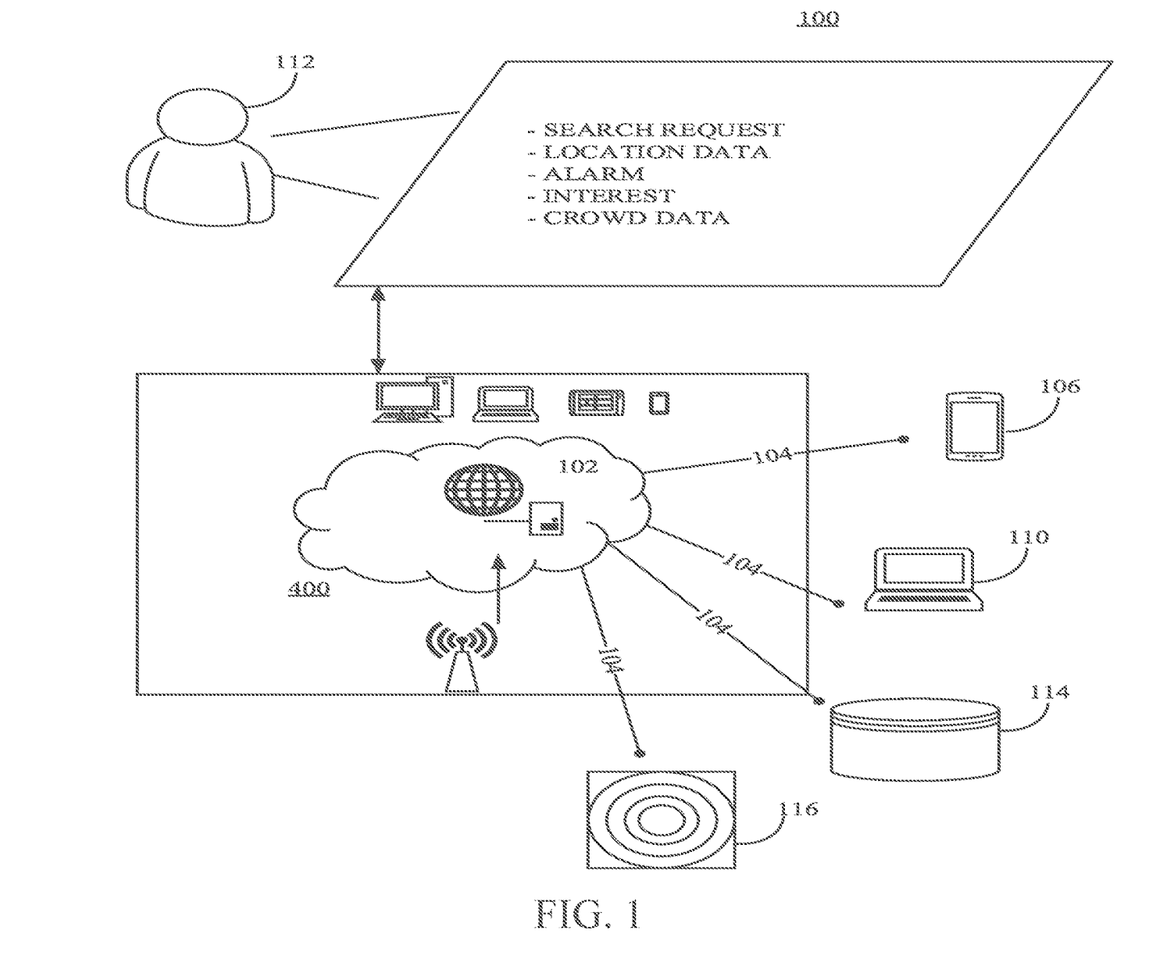
FIG. 1 is an illustration of an online platform consistent with various embodiments of the present disclosure.

FIG. 1 is an illustration of an online platform 100 consistent with various embodiments of the present disclosure. By way of non-limiting example, the online platform 100 for facilitating locating an individual based on UHF RFID tags may be hosted on a centralized server 102, such as, for example, a cloud computing service. The centralized server 102 may communicate with other network entities, such as, for example, a mobile device 106 (such as a smartphone, a laptop, a tablet computer, etc.), other electronic devices 110 (such as desktop computers, server computers, etc.), databases 114, and sensors 116 over a communication network 104, such as, but not limited to, the Internet. Further, users of the online platform 100 may include relevant parties such as, but not limited to, end-users, service providers, care providers, and administrators. Accordingly, in some instances, electronic devices operated by the one or more relevant parties may be in communication with the online platform 100.

A user 112, such as the one or more relevant parties, may access the online platform 100 through a web-based software application or browser. The web-based software application may be embodied as, for example, but not be limited to, a website, a web application, a desktop application, and a mobile application compatible with a computing device 400.

Figure 2:
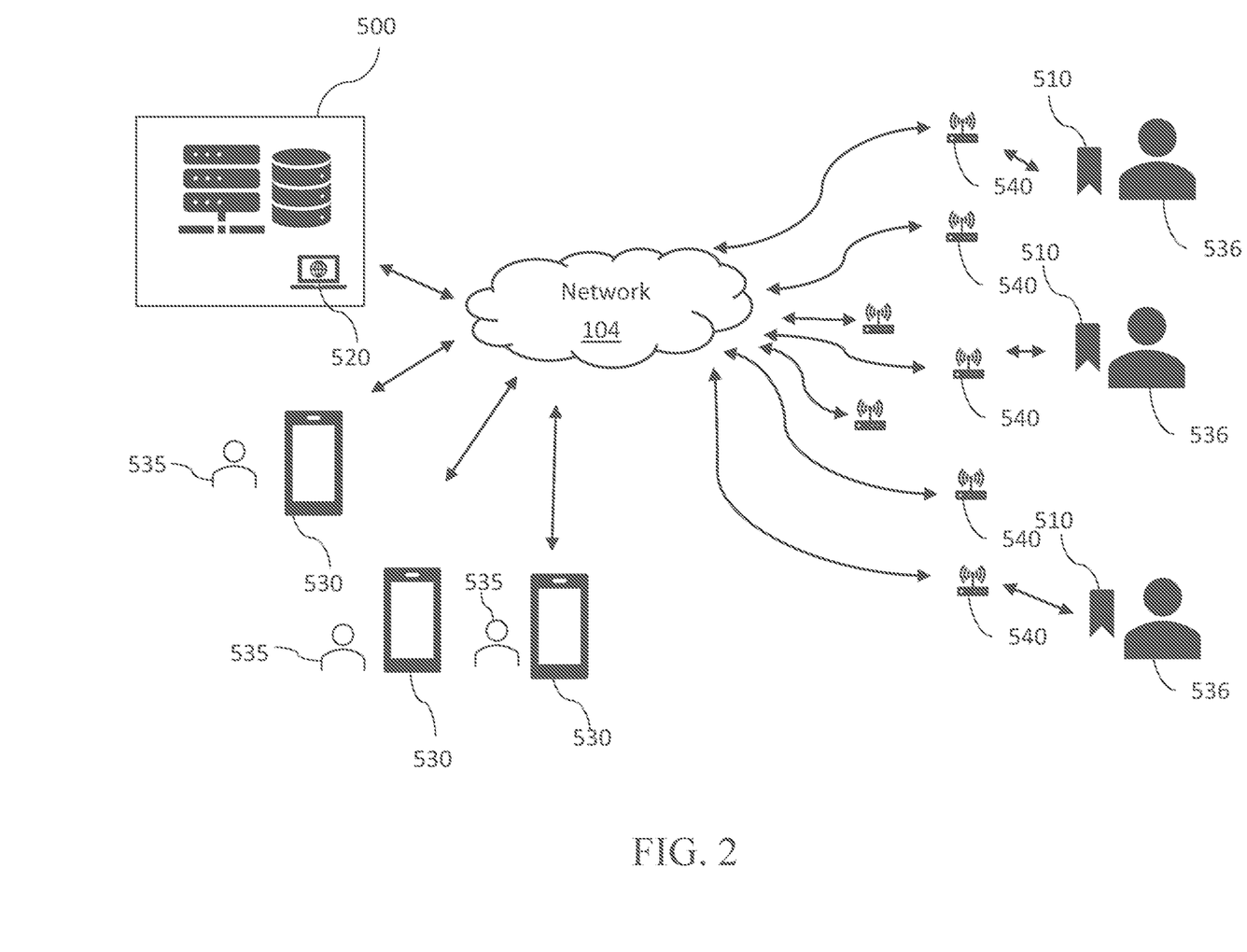
FIG. 2 is a schematic of a system for facilitating locating an individual based on UHF RFID tags, in accordance with some embodiments.
Figure 3:
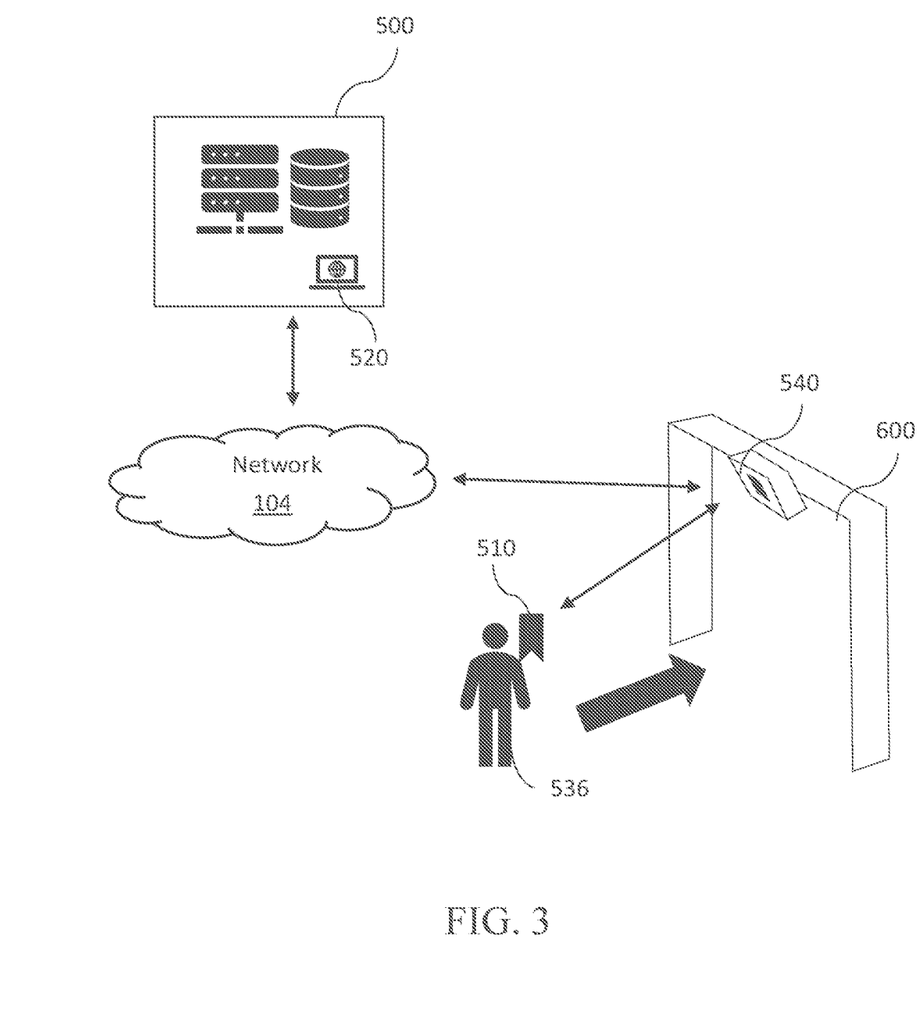
FIG. 3 illustrates a kid with a UHF RFID tag entering a gate with an RFID reader, in accordance with some embodiments.

In further embodiments, a system 500 for facilitating locating an individual based on UHF RFID tags 510 is disclosed. Further, the system 500 may include a communication device 520 (which includes a mobile device 106) configured for receiving a search request from at least one user device 530 associated with at least one user 535. Further, the search request may indicate that the at least one user 535 may want to locate at least one individual (such as a kid). Further, the at least one user 535 may include an individual, an institution, and an organization that may want to locate the at least one individual. Further, the at least one user device 530 may include a smartphone, a tablet, a laptop, a personal computer, and so on. Further, the search request may include an identification number associated with at least one UHF RFID tag 510 of the at least one individual 536. Further, the communication device 520 may be configured for transmitting a search command to at least one RFID reader device 540. Further, the at least one RFID reader 540 may be disposed in a locality such as amusement parks, shopping malls, etc. Further, the locality may include entry points, exit points, assembly points, etc. Further, the search command may facilitate the at least one RFID reader device 540 prompting at least one antenna (or a gate) 600 to generate and transmit Ultra high frequency (UHF) interrogating radio wave for facilitating locating the at least one UHF RFID tag 510 of the at least one individual 536. Further, the at least one antenna 600, as shown in FIG. 3, may be configured for receiving a response wave corresponding to the UHF interrogating radio wave from the at least one UHF RFID tag 510. Further, the at least one antenna 600 may be installed at a predetermined angle for facilitating receiving of the response wave and the transmitting of the UHF interrogating radio wave. Further, the at least one RFID reader device 540 may be configured for generating response data associated with the response wave received from the at least one UHF RFID tag 510 associated with the at least one individual 536. Further, the communication device 520 may be configured for receiving the response data from the at least one RFID reader device 540. Further, the communication device 520 may be configured for transmitting at least one of location data and an alarm to the at least one user device 530.

Figure 4:
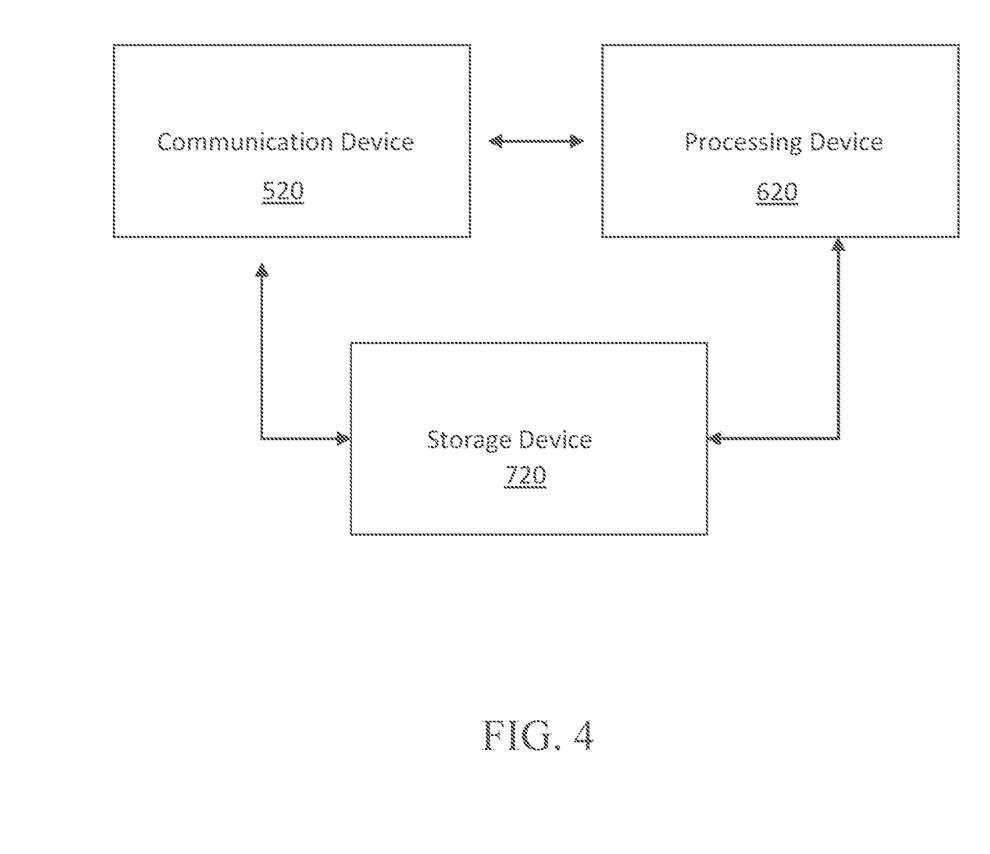
FIG. 4 illustrates a communication device, processing device and storage device of the present invention.

Further, the system 500, as shown in FIG. 4, may include a processing device 620 which may be communicatively connected to the communication device 520 to process various tasks. The processing device 620 may be configured for generating the search command based on the search request. Further, the processing device 620 may be configured for processing at least one of the response data and the search request. Further, the processing device 620 may be configured for determining the location data associated with the at least one individual 536 based on the processing. Further, the location data may include a location of the individual inside the locality, based on the last antenna that read the tag and transmitted the data to the server. This may not be a real time tracking and any location can be based on the last time the tag was detected by an antenna.

Further, the processing device 620 may be configured for generating the alarm based on the location data.

Further, the system 500 may include a storage device 720 which may be communicatively connected to the communication device 520 and the processing device 620 as shown in FIG. 4. configured for storing the search request, the search command, the response data, and the location data.

Figure 5:
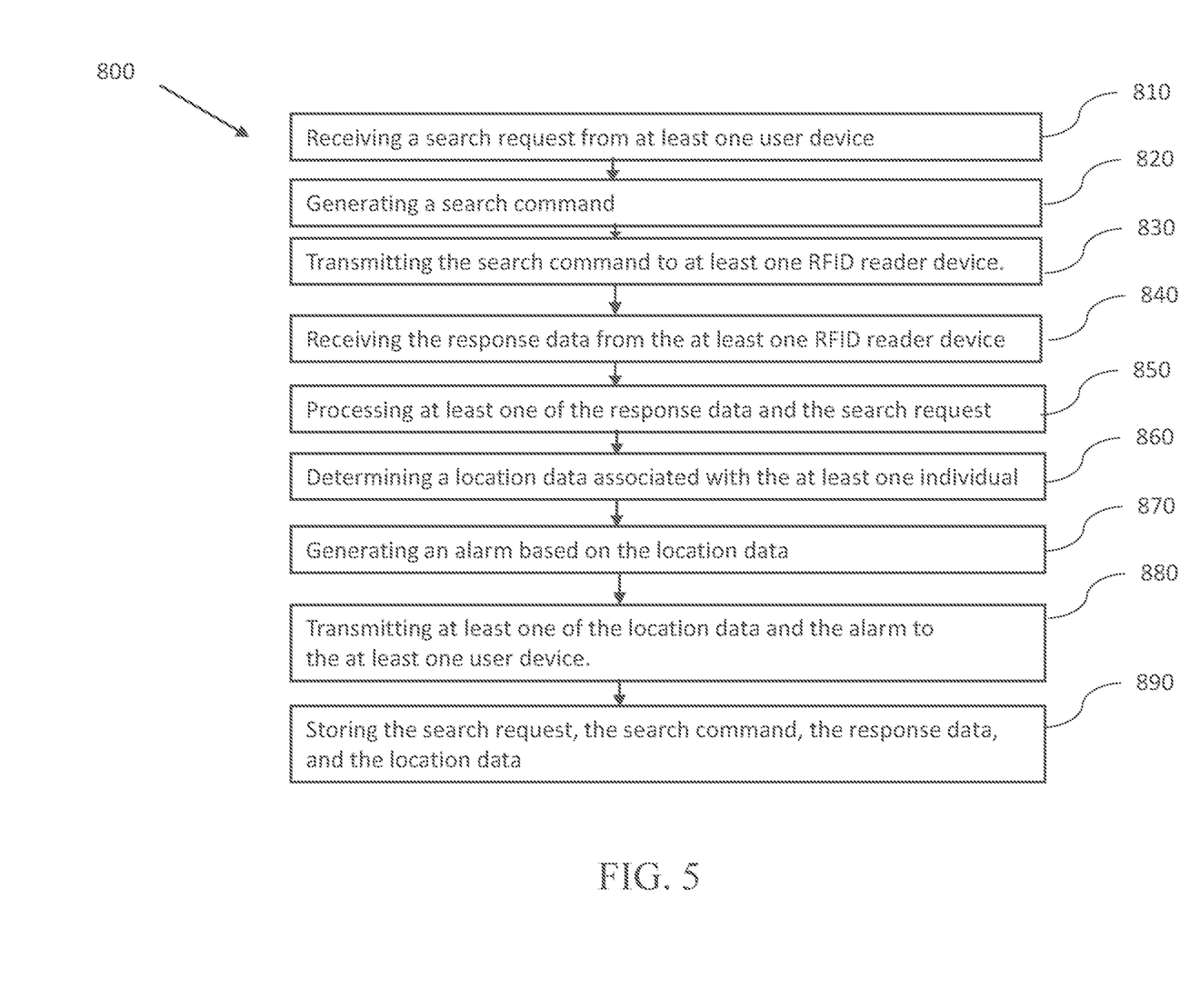
FIG. 5 is a flow chart showing the method of the present invention.

In further embodiments, as shown in FIG. 5, a method 800 for facilitating locating an individual based on UHF RFID tags 510 is disclosed. Further, the method 800 may include receiving, using a communication device 520, a search request from at least one user device associated with at least one user at 810. Further, the search request may indicate that the at least one user may want to locate at least one individual (such as a kid, pet, etc.). Further, the at least one user may include an individual, an institution, and an organization that may want to locate the at least one individual. Further, the at least one user device may include a smartphone, a tablet, a laptop, a personal computer, and so on. Further, the search request may include an identification number associated with at least one UHF RFID tag of the at least one individual.

Further, the method 800 may include generating, using a processing device 620, a search command based on the search request at 820.

Further, the method 800 may include transmitting, using the communication device 520, the search command to at least one RFID reader device 540 at 830. Further, the at least one RFID reader device 540 may be disposed in a locality such as amusement parks, shopping malls, etc. Further, the search command may facilitate the at least one RFID reader device 540 prompting at least one antenna 600 to generate and transmit Ultra high frequency (UHF) interrogating radio wave for facilitating locating the at least one individual 536. Further, the at least one antenna 600 may be configured for receiving a response wave corresponding to the UHF interrogating radio wave from the at least one UHF RFID tag 510. Further, the at least one antenna 600 may be installed at a predetermined angle for facilitating receiving of the response wave and the transmitting of the UHF interrogating radio wave. Further, the at least one RFID reader device 540 may be configured for generating response data associated with the response wave received from the at least one UHF RFID tag 510 associated with the at least one individual 536.

Further, the method 800 may include receiving, using the communication device 520, the response data from the at least one RFID reader device at 840.

Further, the method 800 may include processing, using the processing device 620, at least one of the response data and the search request at 850.

Further, the method 800 may include determining, using the processing device 620, a location data associated with the at least one individual 536 based on the processing at 860. Further, the location data may include a location of the individual inside the locality.

Further, the method 800 may include generating, using the processing device 620, an alarm based on the location data at 870.

Further, the method 800 may include transmitting, using the communication device 520, at least one of the location data and the alarm to the at least one user device at 880.

Further, the method 800 may include storing, using a storage device, the search request, the search command, the response data, and the location data at 890.

Figure 6:
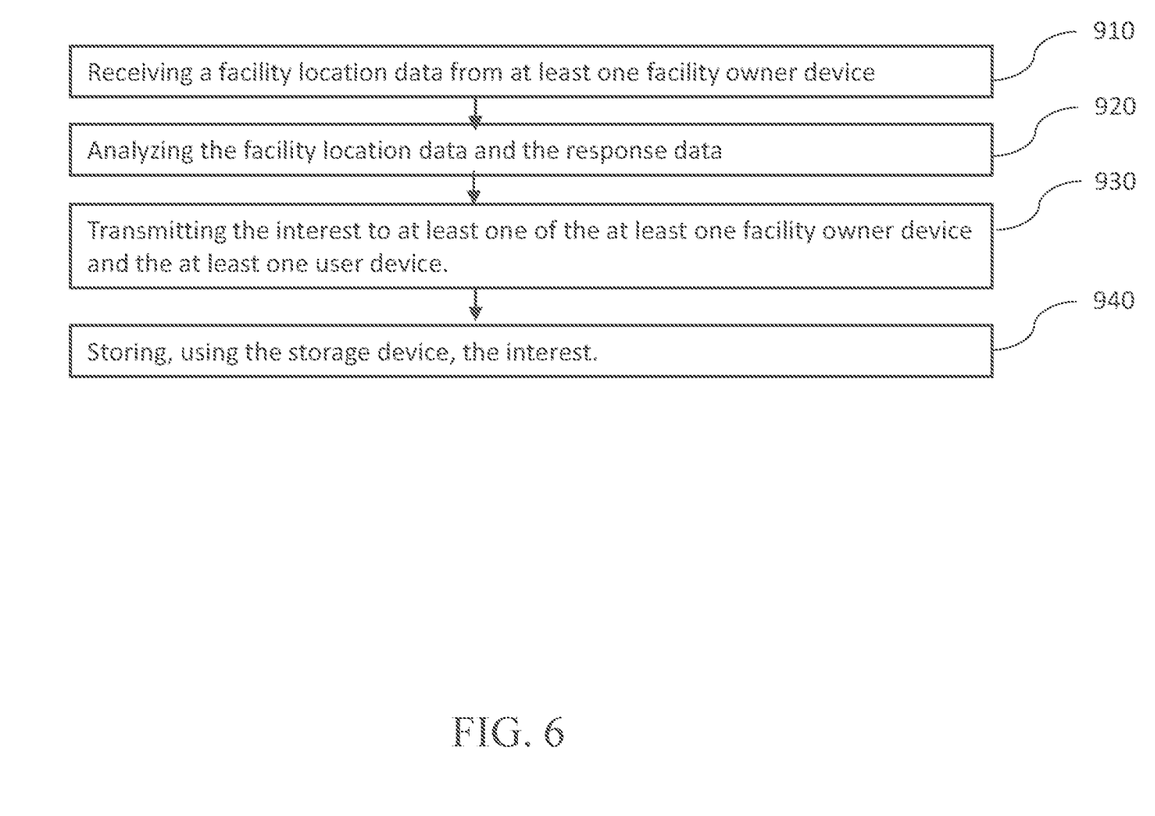
FIG. 6 is a flow chart showing the steps that can be further included in the present invention.

Further, as shown in FIG. 6, in some embodiments, the method 800 may include receiving, using the communication device 520, a facility location data from at least one facility owner device associated with at least one facility owner at 910. Further, the at least one facility owner may include an individual, an institution, and an organization that may own the facility. Further, in an instance, the facility location data may be associated with a facility such as a shopping mall. Further, the at least one facility owner device may include a smartphone, a tablet, a laptop, a personal computer, and so on. Further, the method 800 may include analyzing, using the processing device 620, the facility location data and the response data for determining an interest of the at least one individual at 920. Further, in an embodiment, the processing may be based on the facility location data. Further, the method 800 may include transmitting, using the communication device 620, the interest to at least one of the at least one facility owner device and the at least one user device at 930. Further, the method 800 may include storing, using the storage device, the interest at 940.

Figure 7:
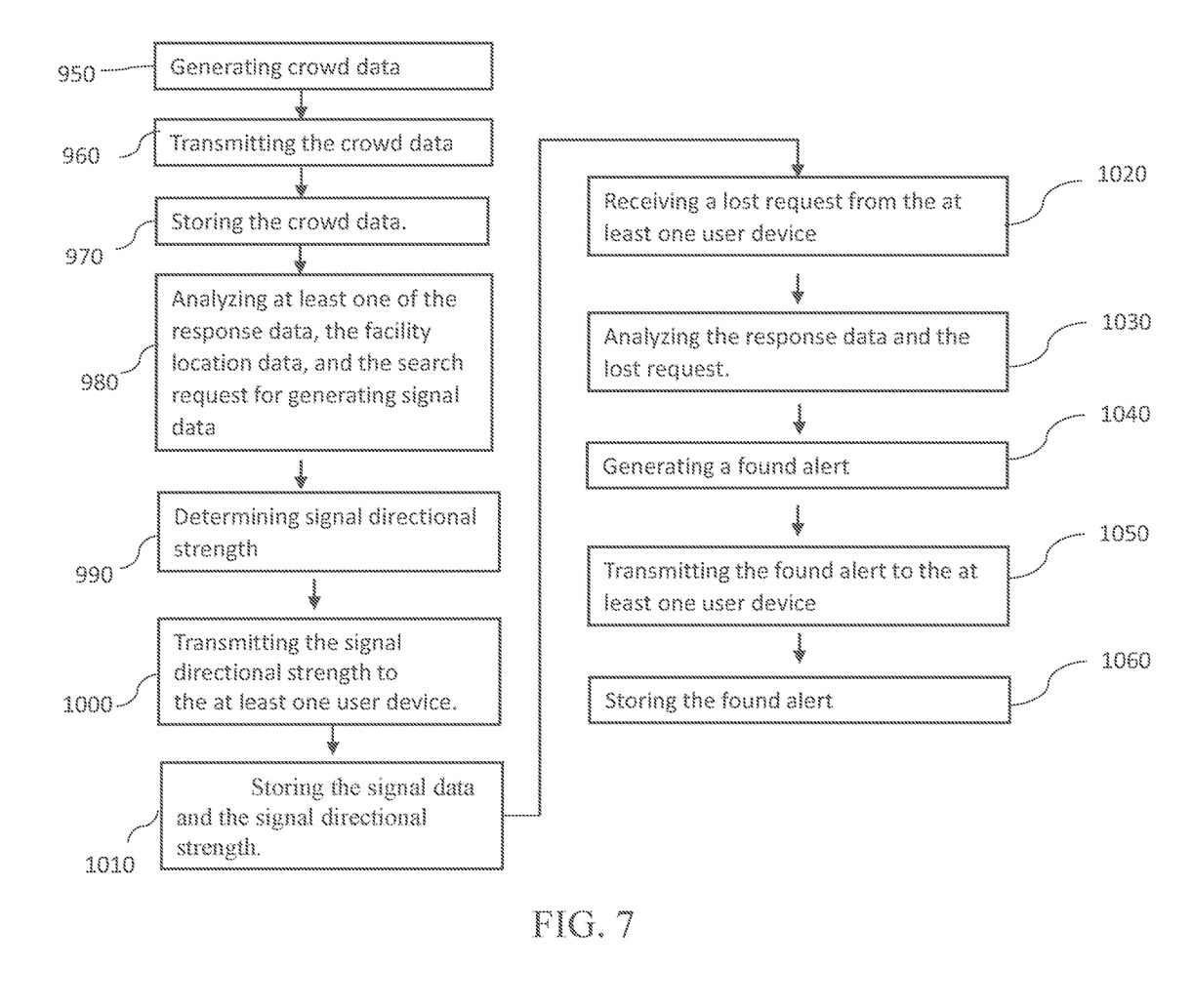
FIG. 7 is a flow chart showing that can be further included in the present invention.

Further, in some embodiments, as shown in FIG. 7, the method 800 may include generating, using the processing device 620, crowd data based on the processing at 950. Further, the crowd data may include a number of people inside the locality. Further, the method 800 may include transmitting, using the communication device 620, the crowd data to at least one of the at least one facility owner device and the at least one user device at 960. Further, the method 800 may include storing, using the storage device, the crowd data at 970.

Further, in some embodiments, the facility location data may include a location of the at least one RFID reader device 540 and the at least one antenna 600 with reference to a structure of the facility. Further, the method 800 may include analyzing, using the processing device 620, at least one of the response data, the facility location data, and the search request for generating signal data at 980. Further, the method 800 may include determining, using the processing device 620, signal directional strength associated with the response wave based on the signal data at 990. Further, the signal directional strength may include a signal powers associated with a location of the at least one RFID reader device 540 with reference to the location of the at least one UHF RFID tag 510 of the at least one individual 536. Further, the signal directional strength may include a direction of movement of the at least one individual that may be moving. Further, the method 800 may include transmitting, using the communication device 520, the signal directional strength to the at least one user device 530 at 1000. Further, in an instance, as the at least one UHF RFID tag 510 gets close to an antenna 600 associated with the disclosed system from the front, the antenna 600 starts reading a signal power (or signal strength) associated with the response wave. Further, the signal power starts from low and goes to high. Further, in another instance, when the at least one UHF RFID tag 510 enters behind the antenna 600, the signal may not be detected until the at least one UHF RFID tag 510 passes a gate associated with the antenna 600. In this case, the signal power starts with a high signal and goes low, as the at least one UHF RFID tag 510 passes by. Further, the method 800 may include storing, using the storage device 720, the signal data and the signal directional strength at 1010.

Further, in some embodiments, the method 800 may include receiving, using the communication device 520, a lost request associated with the at least one UHF RFID tag 510 from the at least one user device 530 at 1020. Further, the lost request may indicate that the at least one user has lost the at least one UHF RFID tag 510 and want to track the at least one UHF RFID tag 510. Further, the lost request may include an identification number of the at least one UHF RFID tag 510. Further, the method 800 may include analyzing, using the processing device 620, the response data and the lost request at 1030. Further, the method 800 may include generating, using the processing device 620, a found alert based on analyzing of the response data and the lost request at 1040. Further, the found alert may include a location of the at least one UHF RFID tag 510. Further, the found alert may include an alarm that may notify the at least one user about the location of the at least one UHF RFID tag 510. Further, the method 800 may include transmitting, using the communication device 520, the found alert to the at least one user device 530 at 1050. Further, the method 800 may include storing, using the storage device, the found alert at 1060.

FIG. 2 is a schematic of a system 500 for facilitating locating an individual based on UHF RFID tags 510, in accordance with some embodiments. Accordingly, the system 500 may include a server communicatively coupled to mobile devices (user device 530).

FIG. 3 illustrates a kid with a UHF RFID tag 510 entering a gate with an RFID reader 540, in accordance with some embodiments.

Figure 8:
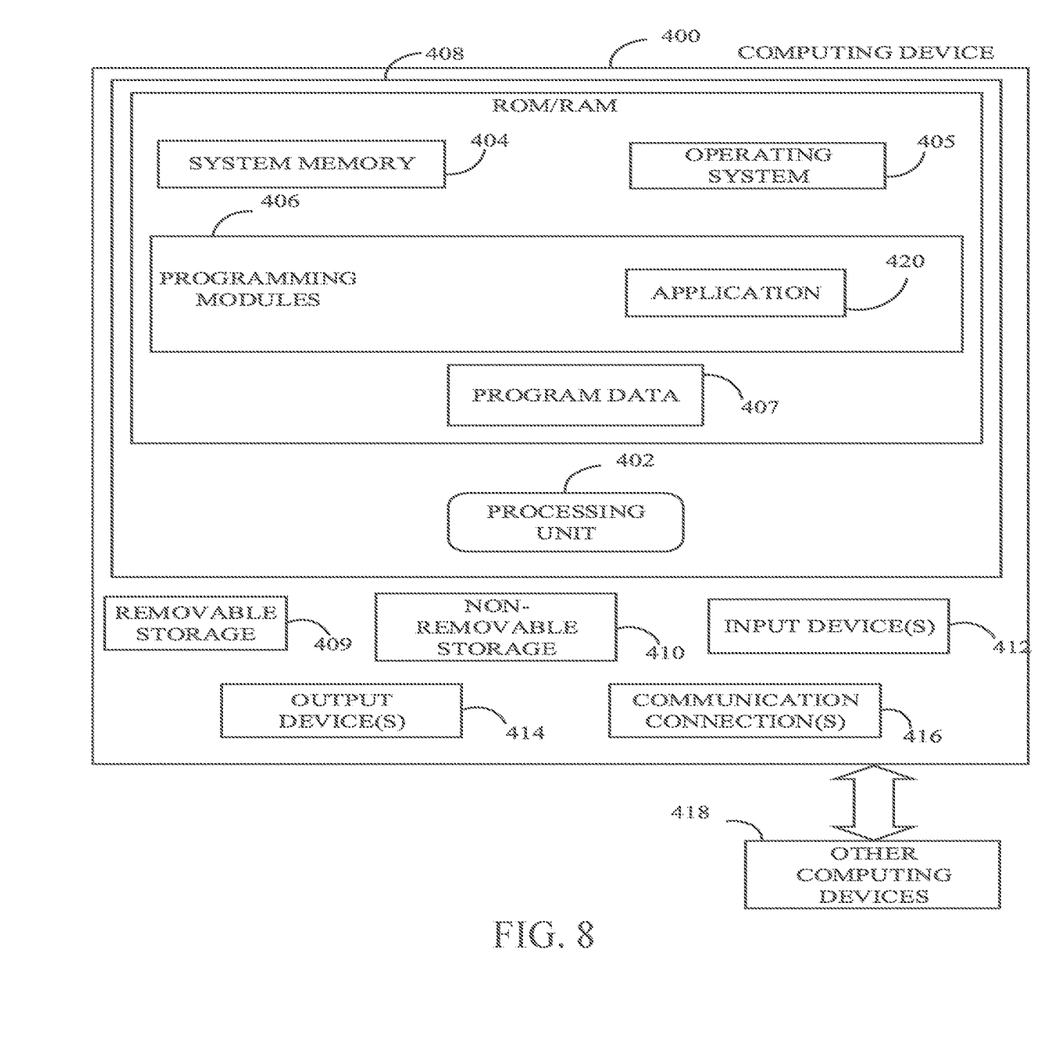
FIG. 8 is a block diagram of a computing device for implementing the methods disclosed herein, in accordance with some embodiments.

With reference to FIG. 8, a system 500 consistent with an embodiment of the disclosure may include a computing device or cloud service, such as computing device 400. In a basic configuration, computing device 400 may include at least one processing unit 402 and a system memory 404. Depending on the configuration and type of computing device, system memory 404 may comprise, but is not limited to, volatile (e.g. random-access memory (RAM)), non-volatile (e.g. read-only memory (ROM)), flash memory, or any combination. System memory 404 may include operating system 405, one or more programming modules 406, and may include a program data 407. Operating system 405, for example, may be suitable for controlling computing device 400's operation. In one embodiment, programming modules 406 may include image-processing module, machine learning module and/or image classifying module. Furthermore, embodiments of the disclosure may be practiced in conjunction with a graphics library, other operating systems, or any other application program and is not limited to any particular application or system. This basic configuration is illustrated in FIG. 4 by those components within a dashed line 408.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computer storage media may include volatile and nonvolatile, removable and non-removable media implemented in any method or technology for storage of information, such as computer-readable instructions, data structures, program modules, or other data. System memory 404, removable storage 409, and non-removable storage 410 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as a keyboard, a mouse, a pen, a sound input device, a touch input device, a location sensor, a camera, a biometric sensor, etc. Output device(s) 414 such as a display, speakers, a printer, etc. may also be included. The aforementioned devices are examples and others may be used.

Computing device 400 may also contain a communication connection 416 that may allow device 400 to communicate with other computing devices 418, such as over a network in a distributed computing environment, for example, an intranet or the Internet. Communication connection 416 is one example of communication media. Communication media may typically be embodied by computer-readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer-readable media as used herein may include both storage media and communication media.

As stated above, a number of program modules and data files may be stored in system memory 404, including operating system 405. While executing on processing unit 402, programming modules 406 (e.g., application 420 such as a media player) may perform processes including, for example, one or more stages of methods, algorithms, systems, applications, servers, databases as described above. The aforementioned process is an example, and processing unit 402 may perform other processes. Other programming modules that may be used in accordance with embodiments of the present disclosure may include sound encoding/decoding applications, machine learning application, acoustic classifiers, etc.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general-purpose graphics processor-based systems, multiprocessor systems, microprocessor-based or programmable consumer electronics, application-specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer-readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid-state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the invention has been explained in relation to its preferred embodiment, it is to be understood that many other possible modifications and variations can be made without departing from the spirit and scope of the invention.

What is claimed is:

1. A method comprising:
receiving, using a communication device, a search request from at least one user device associated with at least one user;
generating, using a processing device, a search command based on the search request;
transmitting, using the communication device, the search command to at least one radio frequency identification (RFID) reader device;
receiving, using the communication device, the response data from the at least one RFID reader device;
processing, using the processing device, at least one of the response data and the search request;
determining, using the processing device, a location data associated with at least one individual based on the processing;
generating, using the processing device, an alarm based on the location data;
transmitting, using the communication device, at least one of the location data and the alarm to the at least one user device;
storing, using a storage device, the search request, the search command, the response data, and the location data;
receiving, using the communication device, a facility location data from at least one facility owner device associated with at least one facility owner;
analyzing, using the processing device, the facility location data and the response data for determining an interest of the at least one individual;
transmitting, using the communication device, the interest to at least one of the at least one facility owner device and the at least one user device;
storing, using the storage device, the interest;
generating, using the processing device, crowd data based on the processing;
transmitting, using the communication device, the crowd data to at least one of the at least one facility owner device and the at least one user device;
storing, using the storage device, the crowd data;
analyzing, using the processing device, at least one of the response data, the facility location data, and the search request for generating signal data;
determining, using the processing device, signal directional strength associated with the response wave based on the signal data;
transmitting, using the communication device, the signal directional strength to the at least one user device;
storing, using the storage device, the signal data and the signal directional strength;
receiving, using the communication device, a lost request associated with at least one Ultra high frequency (UHF) RFID tag from the at least one user device;
analyzing, using the processing device, the response data and the lost request;
generating, using the processing device, a found alert based on analyzing of the crowd data, the signal directional strength, the response data and the lost request;
transmitting, using the communication device, the found alert to the at least one user device;
storing, using the storage device, the found alert.

2. The method as claimed in claim 1, wherein the search request includes at least one request to locate the at least one individual.

3. The method as claimed in claim 2, wherein the search request includes an identification number associated with the at least one UHF RFID tag.

4. The method as claimed in claim 1, wherein the search command activates the at least one RFID reader device and at least one antenna to generate and transmit UHF interrogating radio wave for locating the at least one individual.

5. The method as claimed in claim 1, wherein the found alert includes a location of the at least one UHF RFID tag.

6. The method as claimed in claim 1, wherein if the at least one UHF RFID tag moves close to an antenna from a front side of the antenna, the antenna starts reading the signal directional strength that starts from a lowest signal directional strength.

7. The method as claimed in claim 1, wherein if the at least one UHF RFID tag moves close to an antenna from a back side of the antenna and passes though a gate associated with an antenna, the antenna starts reading the signal directional strength which starts from a highest signal directional strength.

8. A system comprising:
a computer network;
a first processing device communicatively coupled to a memory; and
at least one second processing device configured to share the computer network with the first processing device,
wherein the first processing device is configured to execute instructions to:
receive, using a communication device, a search request from at least one user device associated with at least one user;
generate, using a third processing device, a search command based on the search request;
transmit, using the communication device, the search command to at least one radio frequency identification (RFID) RF-ID reader device;
receive, using the communication device, the response data from the at least one RFID reader device;
process, using the third processing device, at least one of the response data and the search request;
determine, using the third processing device, a location data associated with the at least one individual based on the processing;
generate, using the third processing device, an alarm based on the location data;
transmit, using the communication device, at least one of the location data and the alarm to the at least one user device;
store, using a storage device, the search request, the search command, the response data, and the location data;
receive, using the communication device, a facility location data from at least one facility owner device associated with at least one facility owner;
analyze, using the third processing device, the facility location data and the response data for determining an interest of the at least one individual;
transmit, using the communication device, the interest to at least one of the at least one facility owner device and the at least one user device;
store, using the storage device, the interest;
generate, using the third processing device, crowd data based on the processing;
transmit, using the communication device, the crowd data to at least one of the at least one facility owner device and the at least one user device;
store, using the storage device, the crowd data;
analyze, using the third processing device, at least one of the response data,
the facility location data, and the search request for generating signal data;
determine, using the third processing device, signal directional strength associated with the response wave based on the signal data;
transmit, using the communication device, the signal directional strength to the at least one user device;
store, using the storage device, the signal data and the signal directional strength;
receive, using the communication device, a lost request associated with at least one Ultra high frequency (UHF) RFID tag from the at least one user device;
analyze, using the third processing device, the response data and the lost request;
generate, using the third processing device, a found alert based on analyzing of the crowd data, the signal directional strength, the response data and the lost request;
transmit, using the communication device, the found alert to the at least one user device;
store, using the storage device, the found alert.

9. The system as claimed in claim 8, wherein the search request includes at least one request to locate the at least one individual.

10. The system as claimed in claim 9, wherein the search request includes an identification number associated with the at least one UHF RFID tag.

11. The system as claimed in claim 8, wherein the search command activates the at least one RFID reader device and at least one antenna to generate and transmit interrogating radio wave for locating the at least one individual.

12. The system as claimed in claim 8, wherein the found alert includes a location of the at least one UHF RFID tag.

13. The system as claimed in claim 8, wherein if the at least one UHF RFID tag moves close to an antenna from a front side of the antenna, the antenna starts reading the signal directional strength that starts from a lowest signal directional strength.

14. The system as claimed in claim 8, wherein if the at least one UHF RFID tag moves close to an antenna from a back side of the antenna and passes through a gate associated with an antenna, the antenna starts reading the signal directional strength which starts from a highest signal directional strength.

15. A non-transitory computer readable medium containing computer-readable instructions stored therein for causing a processing device to perform operations to:
receive, using a communication device, a search request from at least one user device associated with at least one user;
generate, the processing device, a search command based on the search request;
transmit, using the communication device, the search command to at least one radio frequency identification (RFID) reader device;
receive, using the communication device, the response data from the at least one RFID reader device;
process, using the processing device, at least one of the response data and the search request;
determine, using the processing device, a location data associated with the at least one individual based on the processing;
generate, using the processing device, an alarm based on the location data;
transmit, using the communication device, at least one of the location data and the alarm to the at least one user device;

store, using a storage device, the search request, the search command, the response data, and the location data;

receive, using the communication device, a facility location data from at least one facility owner device associated with at least one facility owner;

analyze, using the processing device, the facility location data and the response data for determining an interest of the at least one individual;

transmit, using the communication device, the interest to at least one of the at least one facility owner device and the at least one user device;

store, using the storage device, the interest;

generate, using the processing device, crowd data based on the processing;

transmit, using the communication device, the crowd data to at least one of the at least one facility owner device and the at least one user device;

store, using the storage device, the crowd data;

analyze, using the processing device, at least one of the response data, the facility location data, and the search request for generating signal data;

determine, using the processing device, signal directional strength associated with the response wave based on the signal data;

transmit, using the communication device, the signal directional strength to the at least one user device;

store, using the storage device, the signal data and the signal directional strength;

receive, using the communication device, a lost request associated with the at least one Ultra high frequency (UHF) RFID tag from the at least one user device;

analyze, using the processing device, the response data and the lost request;

generate, using the processing device, a found alert based on analyzing of the crowd data, the signal directional strength, the response data and the lost request;

transmit, using the communication device, the found alert to the at least one user device;

store, using the storage device, the found alert.

16. The non-transitory computer readable medium as claimed in claim 15, wherein the search request includes at least one request to locate the at least one individual.

17. The non-transitory computer readable medium as claimed in claim 16, wherein the search request includes an identification number associated with the at least one UHF RFID tag.

18. The non-transitory computer readable medium as claimed in claim 15, wherein the search command activates the at least one RFID reader device and at least one antenna to generate and transmit UHF interrogating radio wave for locating the at least one individual.

19. The non-transitory computer readable medium as claimed in claim 15, wherein if the at least one UHF RFID tag moves close to an antenna from a front side of the antenna, the antenna starts reading the signal directional strength that starts from a lowest signal directional strength.

20. The non-transitory computer readable medium as claimed in claim 15, wherein if the at least one UHF RFID tag moves close to an antenna from a back side of the antenna and passes though a gate associated with an antenna, the antenna starts reading the signal directional strength which starts from a highest signal directional strength.

* * * * *